United States Patent
Turner

(10) Patent No.: US 6,834,435 B2
(45) Date of Patent: Dec. 28, 2004

(54) MULTI-PURPOSE LEVELING DEVICE

(76) Inventor: Steven Turner, 158 S. 350 East, Clearfield, UT (US) 84015

( * ) Notice: Subject to any disclaimer, the term of this patent is extended or adjusted under 35 U.S.C. 154(b) by 45 days.

(21) Appl. No.: 10/213,161

(22) Filed: Aug. 6, 2002

(65) Prior Publication Data

US 2003/0066198 A1 Apr. 10, 2003

Related U.S. Application Data

(60) Provisional application No. 60/312,572, filed on Aug. 18, 2001.

(51) Int. Cl.$^7$ .............................................. H04L 12/50
(52) U.S. Cl. ............................. 33/370; 33/412; 33/390; 33/529
(58) Field of Search .......................... 33/370, 371, 372, 33/373, 375, 390, 412, 529

(56) References Cited

U.S. PATENT DOCUMENTS

| | | | | |
|---|---|---|---|---|
| 1,133,936 A | * | 3/1915 | Coughlin | 33/371 |
| 1,377,720 A | * | 5/1921 | Neff | 33/373 |
| 1,613,776 A | * | 1/1927 | Will | 33/370 |
| 2,306,373 A | | 3/1942 | Belden | |
| 2,277,071 A | | 6/1942 | Cassell | |
| 2,397,550 A | | 3/1946 | Kroll | |
| 2,452,930 A | | 6/1948 | Ivey | |
| 2,659,975 A | | 5/1953 | van Gundy | |
| 2,757,458 A | | 12/1956 | Zipser | |
| 2,993,281 A | * | 7/1961 | Dock | 33/211 |
| 3,707,772 A | * | 1/1973 | Cotter | 33/373 |
| 3,820,249 A | | 6/1974 | Stone | |
| 3,984,919 A | * | 10/1976 | Guisti | 33/381 |
| 4,168,578 A | * | 9/1979 | VanderWerf | 33/371 |
| 4,343,093 A | | 8/1982 | Eadens | |
| 4,970,796 A | | 11/1990 | Masters et al. | |
| 4,976,040 A | | 12/1990 | Mish et al. | |
| D317,725 S | | 6/1991 | McCord | |
| 5,207,004 A | * | 5/1993 | Gruetzmacher | 33/373 |
| 5,421,094 A | | 6/1995 | McCord et al. | |
| 6,173,502 B1 | * | 1/2001 | Scarborough | 33/371 |
| 6,351,875 B1 | * | 3/2002 | Wright et al. | 33/350 |
| 6,427,348 B1 | * | 8/2002 | Webb | 33/375 |
| 6,502,322 B2 | * | 1/2003 | Smochek | 33/373 |
| 6,568,095 B2 | * | 5/2003 | Snyder | 33/370 |

* cited by examiner

Primary Examiner—Christopher W. Fulton
Assistant Examiner—Amanda J Hoolahan

(57) ABSTRACT

A multiple use level having an elongated body having two flange-like legs which extend at a right angle from one another from the corner apex. An L-shaped bracket is rotatably attached to one of the legs such that it may be freely rotated to any desired angle, then locked in position. The bracket includes a bull's-eye level on a first face thereof and a center line vial level attached to a rotating dial on a second face. A sighting laser may be detachably mounted on the L-shaped bracket. The level may be attached to a pipe or other member using magnets disposed in the body thereof or with an attachment cord. A flange bracket may be removable attached to one leg allowing pipe flanges to be oriented, alternatively the flange bracket may be integrated into the leg. Methods and processes for positioning construction members are also disclosed.

17 Claims, 7 Drawing Sheets

US 6,834,435 B2

MULTI-PURPOSE LEVELING DEVICE

RELATED APPLICATIONS

This application claims the benefit of U.S. Provisional Application No. 60/312,572, filed Aug. 18, 2001, which is incorporated herein by reference in its entirety.

FIELD OF THE INVENTION

The present invention is directed to instruments and levels for properly positioning elongate members, such as conduit piping and joists and studs. It is more particularly directed to such a level that enables simultaneous positioning of multiple angles and to include additional tool functions.

BACKGROUND

A wide variety of leveling and positioning tools are known and used by those in the building and construction trades. Specialty levels and other tools are often used to allow the positioning, attachment and processing of different construction materials.

U.S. Design Pat. No. 317,725 is directed to a level including an angular base with a bull's-eye bubble level attached thereto for leveling an elongated structural member. Levels marketed under the tradename LEVLIT™, as early as 1991, included rubberized magnets attached to an angled base, a bubble housing with a bubble therein adjustably secured to an outer surface of one leg of the angled base by a threaded post projecting from the housing through the base and secured by a wingnut, and a ruler marked on the outer surface of the other leg. A velcro strap attached to the angled base may be used to secure the LEVLIT™ to a structure. U.S. Pat. No. 5,4521,094 similarly discloses a level including an angular base, a bubble housing with a bull's-eye bubble rotatable member attached to a leg of the housing with a bolt and spring combination allowing the rotatable member to be pulled out from the base and moved to one of a limited number of angled locking positions.

It would be desirable to provide a level for use with elongated structural members that has the ability to be adjusted to any desired angle for leveling. It would be further desirable for such a level to include a number of different functions, thereby allowing a tradesman to carry and use a single precision tool for a number of different purposes.

SUMMARY OF THE INVENTION

Various embodiments of the present invention include an elongated body having two flange-like legs which extend at a right angle from one another from the corner apex. An L-shaped bracket is rotatably attached to one of the legs, and includes a bull's-eye level on a first face thereof. A center line vial level is attached to a rotating dial on a second face of the L-shaped bracket. A sighting laser may be detachably mounted on the L-shaped bracket. The bracket may be freely rotated around as a protractor, to any desired angle and then locked in position. Two marking holes may be located in the apex of the body, allowing a punch or similar object to be inserted for marking therethrough. The level may be attached to a pipe or other member using magnets disposed in the body thereof or with an attachment cord. A flange bracket may be removable attached to one leg allowing pipe flanges to be oriented, alternatively the flange bracket may be integrated into the leg. Utilizing the various embodiments of the present invention, an elongated member of a construction material, such as piping or conduit, may be properly positioned in multiple dimensions. Methods for such positioning are included in the present invention.

BRIEF DESCRIPTION OF THE DRAWINGS

The nature of the present invention as well as other embodiments of the present invention may be more clearly understood by reference to the following detailed description, to the appended claims, and to the several drawings herein, wherein:

BEST MODE OF THE INVENTION

The following describes some preferred embodiments of the invention. It will be appreciated that the examples used herein are illustrative only and are not to limit the invention.

The present invention is directed to apparatus and methods for positioning construction members, such as pipes, conduit, boards, beams, etc. into position. A level with unique features allows multiple functions to be performed with a single tool.

Figure 1:
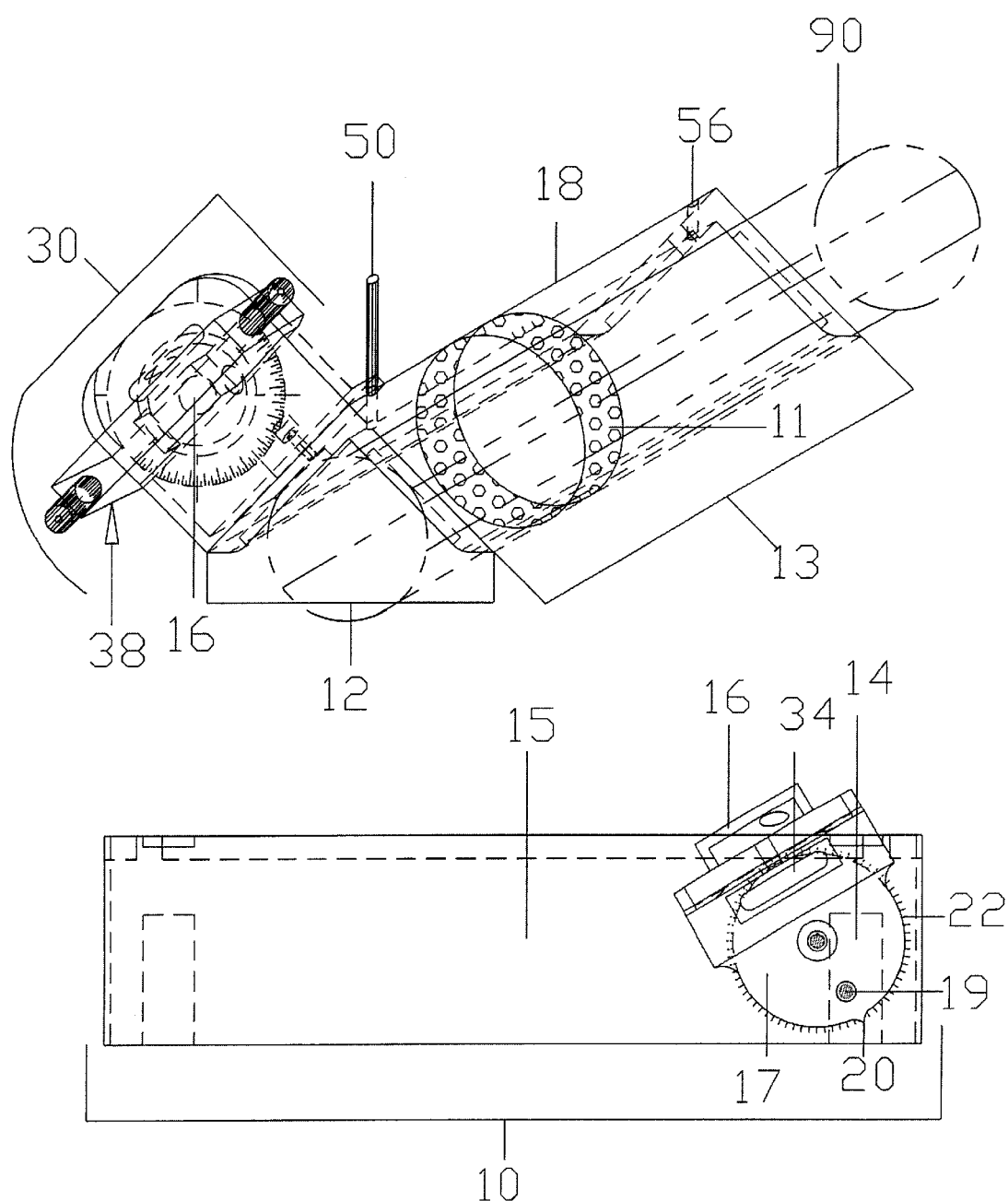
FIG. 1 is a perspective view of a first embodiment of a multipurpose leveling device shown attached to a pipe, in accordance with the principles of the present invention.

Turning to FIG. 1, a first embodiment of a multi-use level 10 in accordance with the principles of the present invention is depicted as attached to a pipe P. A angular body 12 is formed from of two planar panels 13 and 15 which join at an apex 18. A level shelf 14 is rotatably attached to one of the planar panels 13 by the protractor bracket 17. A first surface of the level shelf 14 has a bulls-eye level 16 disposed thereon. The protractor bracket 17 may be freely rotated on an axis and includes an angular indicator 20, which may be positioned according to the graduations 22, with the selected angle maintained by a locking thumbscrew 19 that presses against the member 15 when tightened. Graduations 22 preferably will detail angular degrees with respect to the level 10, in order to allow the level shelf to be locked into a desired position for leveling to occur with respect to a construction member, such as a pipe, to which the level 10 is attached. Small indentations may be formed at certain graduations to provide a secure locking of the protractor bracket. Of course, it will be appreciated that graduations 22 formed on either the planar member 13 or the protractor bracket 17 (with an indicator on the planar member), as is desired by the user.

Figure 2:
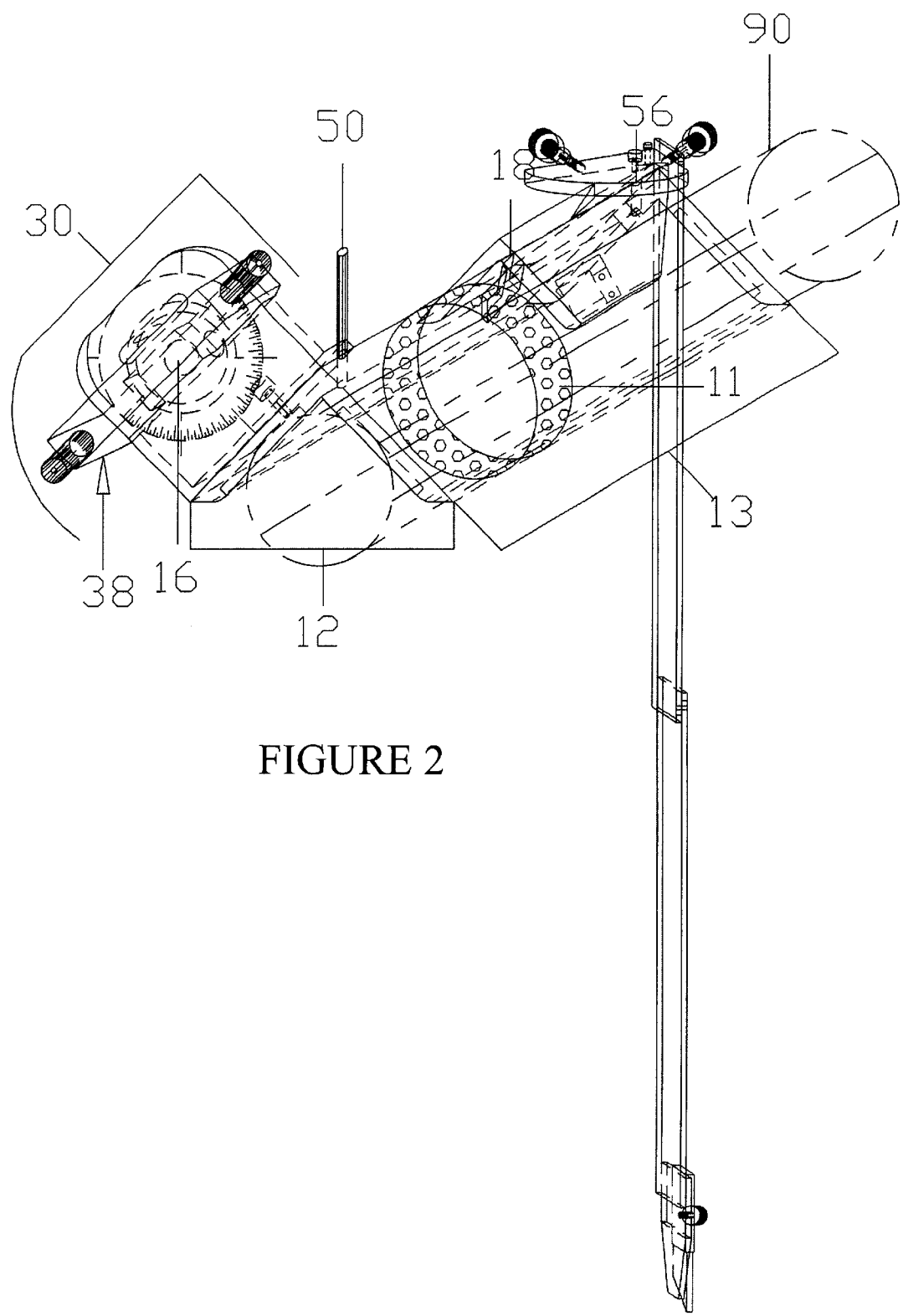
FIG. 2 is a another perspective view of the embodiment of FIG. 1, depicting a second surface of a rotating level shelf thereof.

The second surface of the level shelf 14 is depicted in FIG. 2. A rotatable dial 30 includes a bubble level 34 and may be rotated to a desired angle, indicted by an indicator and gradations 32. It will be appreciated that gradations 32 may be formed on either the level shelf 14 or the rotating dial 30, as desired by the user. A directional laser 38 is also shown disposed on the dial 30. It will be appreciated that the directional laser 38 may be as simple as a laser pointer, or may be a specialized construction or survey directional laser. A directional laser 38 may be removably attachable to either surface of the level shelf (as desired) and provides the level 10 with additional positioning abilities as a transit level.

The components of the level 10, such as body 12, protractor bracket 17, and shelf 14 may be constructed of any suitable material. For example, construction from a metallic material, such as steel creates a durable level with the ability to be used on hot members, such as active steam pipes. Construction from plastic or other polymeric or composite materials would allow for the reduction of cost, and high temperature resistant plastics would allow for use in elevated temperature environments. Graduations 22, graduations 32 and other indicia may be engraved on the level for durability, or may painted or printed thereon for ease of manufacture.

Figure 3:
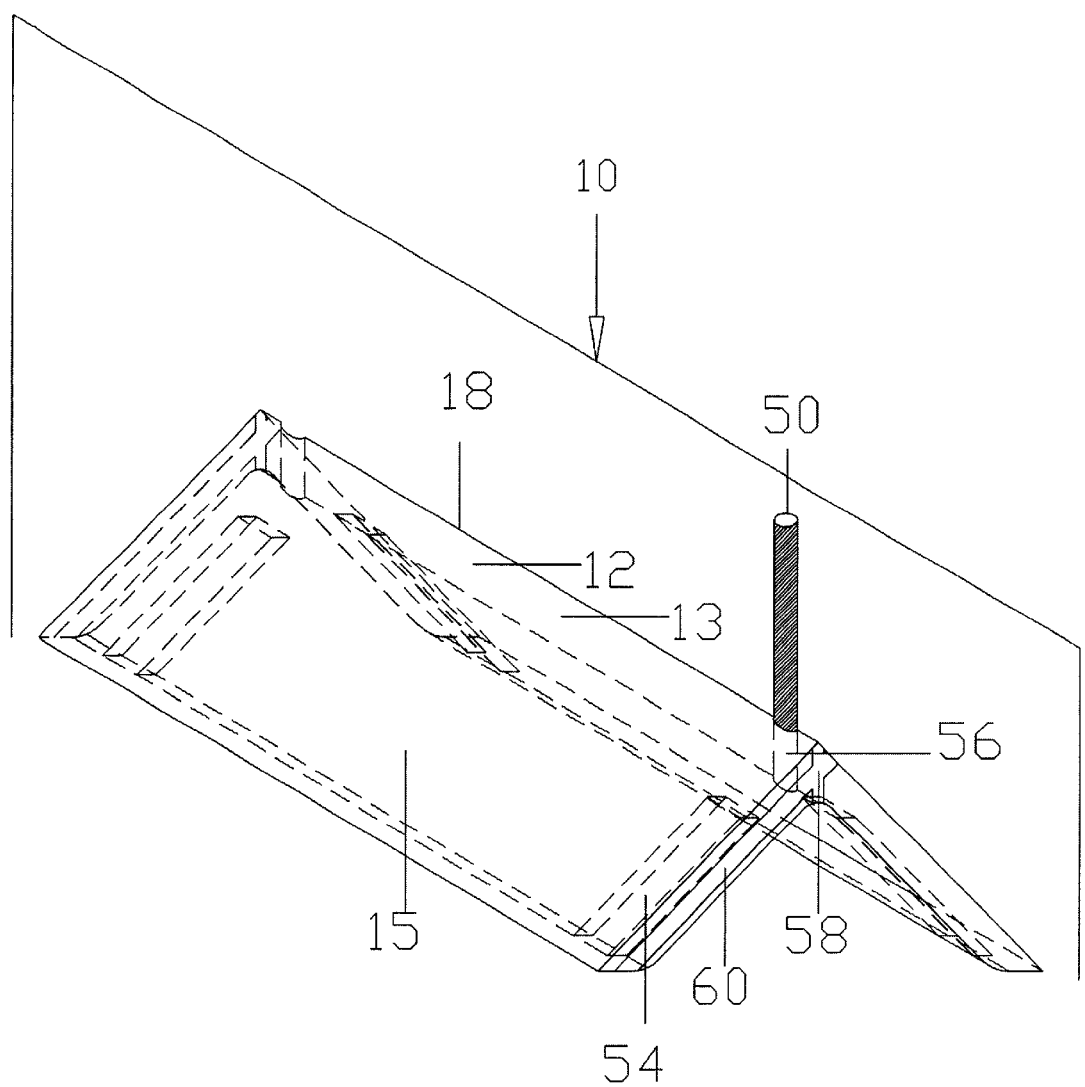
FIG. 3 is a perspective view of one embodiment of an end of a level body in accordance with the present invention.

FIG. 3 depicts an end of a body 12 for a multi-use level 10, that is in accordance with the principles of the present invention. As shown in the cutout portion of FIG. 3, magnets 54 may be contained within the planar members 13 and 15, and may be exposed at the rear surface thereof. The level body 12 may be attached to a metallic member, such as a steel or cast iron pipe by placing the body in contact with the pipe such that the magnets 54 hold the body in place. Where present, magnets may be neodynium magnets or any other suitable magnet. With non-metallic pipes a strap 11 (shown in FIG. 1), may be used to retain the level body in position. It will be appreciated the strap 11 may be a velcro strip, a strap with a buckle or other fastener, or any other suitable strap.

In line with apex 18, a plumb groove 58 may be formed in the end of the body 12. When in use, a plumb bob may be positioned even with the end of the body 12. As the string of the bob (depicted in phantom as string S) passes through the plumb groove 58, an accurate measurement of the plumb length of the pipe, including any flanges and fittings may be obtained.

One or more marking holes 56 may be pass through body 12 at the apex 18. The marking hole 56 allows a punch 56 to be inserted in a direction perpendicular to the hypotenuse of a right triangle formed by the planar member 15 and 13. Where present, it is preferred that at least two or more marking holes are present, spaced towards the ends of the body 12, however other arrangements can be used and are within the scope of the present invention. A punch 50 or other marking tool may be inserted through the marking hole 56 and used to mark a member to which the level 10 is attached, as illustrated by arrow 52. For example, a punch 50 may be inserted through marking hole 56, making contact with a metal pipe. The punch 50 may then be tapped with a hammer to mark the pipe in a desired location.

Figure 4:
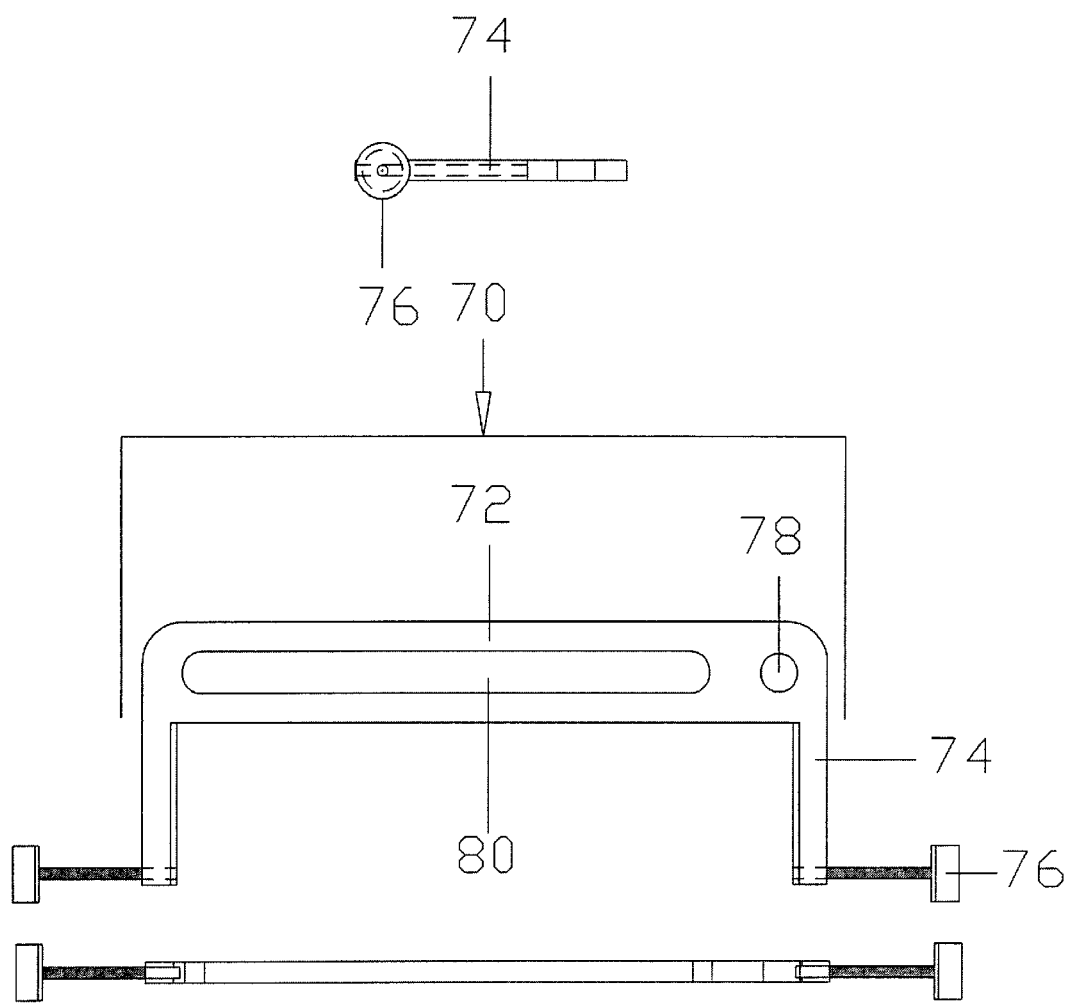
FIG. 4 is a frontal view of one embodiment of a removable flange bracket that may be used with the embodiment of FIGS. 1 and 2, in accordance with the principles of the present invention.

Taking FIG. 3 in connection with FIG. 4, a bracket groove 60 may be formed along the end of a planar member 13, parallel to the planar member 13. A flange bracket 70 (FIG. 4) may be installed on the body 12. The flange bracket 70 includes two attachment legs 74 parallel to one another and extending from an elongated bracket body 72 in a direction perpendicular to an long axis of the elongated body 72. The distance between the two attachment legs 74 is equivalent to the length of the planar member 13. The flange bracket is releasable attachable to the body 12 by sliding the attachment legs 74 (or an interaction structure, such as a ridge located thereon) into the bracket grooves 60 located on either end of the planar member 13. Attachment screws 76 may then be tightened to secure the bracket in place.

Flange bracket 70 includes structures allowing the multi-use level 10 to be attached to a flange bracket on a metal pipe, or similar structure. A bolt hole 78 allows a pin or bolt to be inserted therethrough to attach to a flange bracket. An elongated bolt groove 80 running parallel to the long axis of the flange body 72 in line with bolt hole 78. Elongated bolt groove 80 allows a second pin or bolt to be attached to a pipe flange at any desired location along the bolt groove 80, allowing the level to be attached to any size pipe flange. It will be appreciated that rather than a separate flange, the planar member 13 may be extended and include the appropriate connection structures for connection to a pipe flange and such embodiments are within the scope of the present invention.

Figure 5:
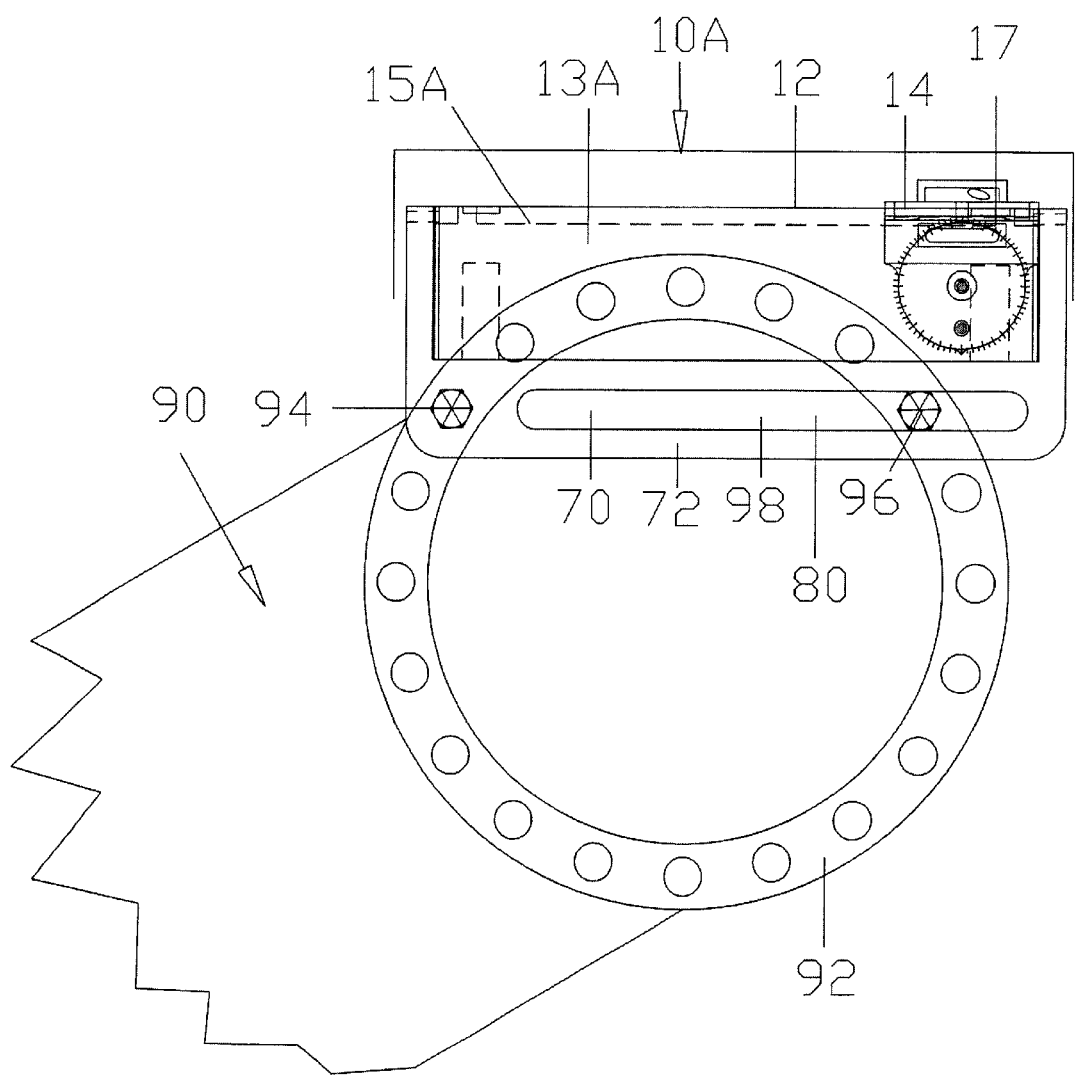
FIG. 5 is a front perspective view of another embodiment of a multi-use level in accordance with the principles of the present invention, shown in position for use on a pipe flange.

Turning to FIG. 5, an embodiment of a multi-use level 10A in accordance with the principles of the present invention is shown attached to a flange 92 of a pipe 90. Rather than a removable flange bracket, level 10A includes flange connection structures disposed in planar member 13A. Bolt 94 inserted through bolt hole (not visible) and bolt 96 inserted through elongated bolt groove 98 through holes in the flange 92 hold the level in position across the top of the flange 92. It is preferred that planar member 15A rest on top the upper edge of flange 92.

As a second alternative to the use of a flange bracket 70, pins or bolts may simply be inserted through the holes of a pipe flange 92. The edge of a planar member 13 may be set on top the pins, with the second planar member 15 resting on the upper edge of the flange 92 or the outer surface of planar member 15 may be laid flat across the pins with planar member 13 flat against the flange 92 surface and the level shelf 14 positioned above the flange 92. With the level 10 positioned on the flange 92, a desired angle placed on the protractor bracket 17 may be obtained for the flange 92. This allows a level position to quickly be obtained and maintained across two holes of a flange 92 aiding in the adjustment of multiple pipes into a system.

Figure 6:
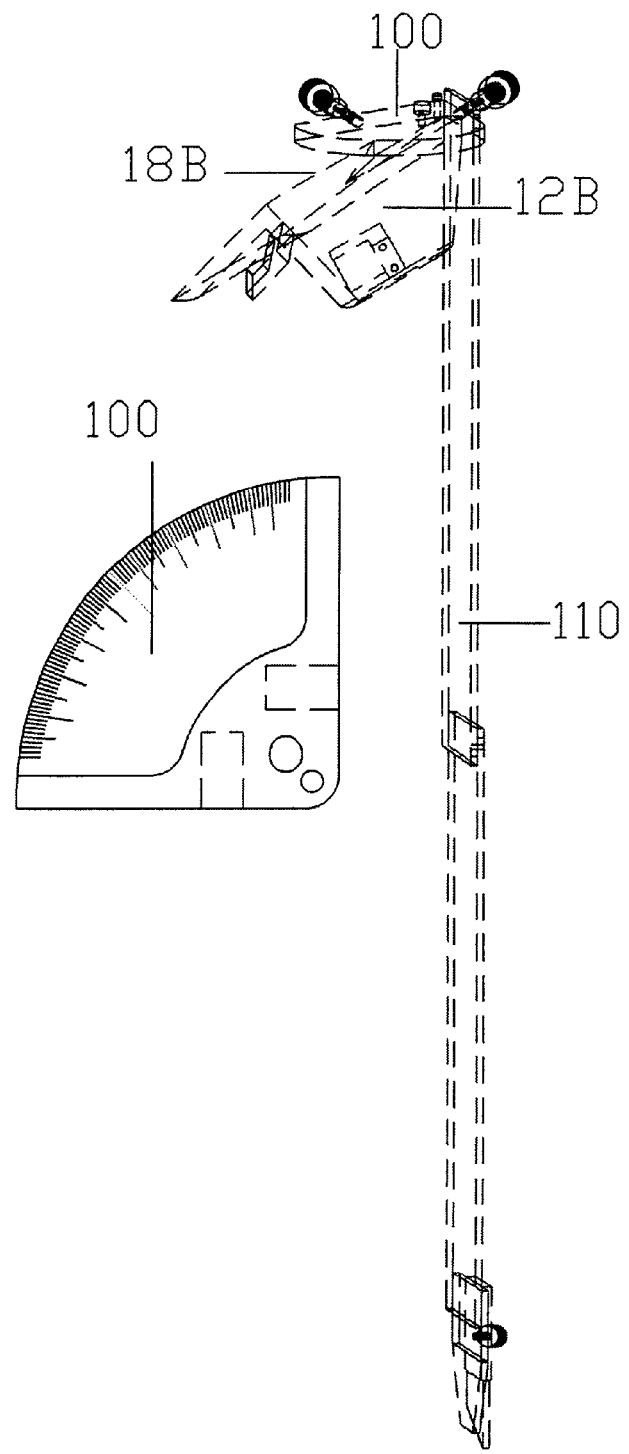
FIG. 6 is a perspective view of another embodiment of a level in accordance with the principles of the present invention, including a miter marking feature.
Figure 6:
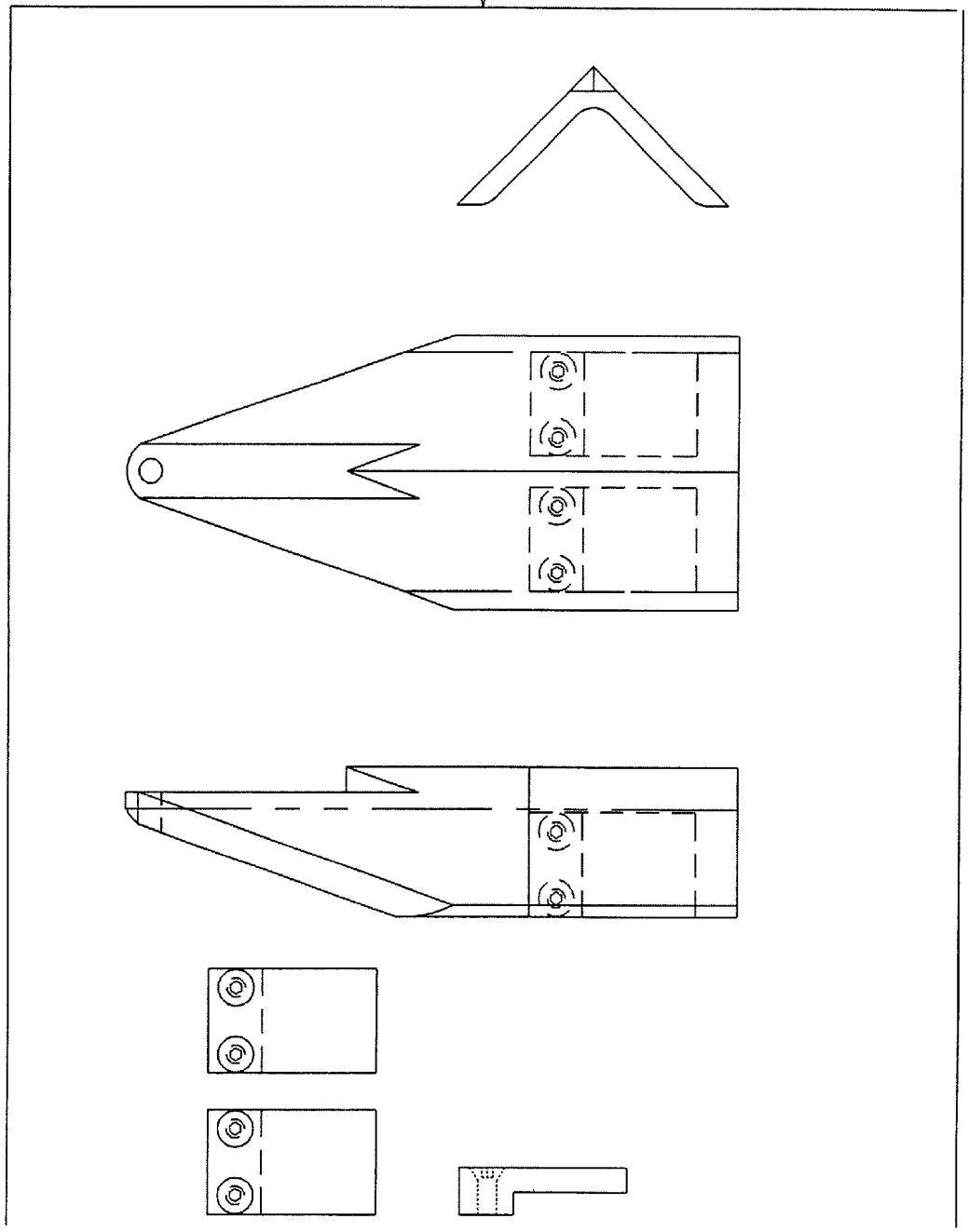

Turning to FIG. 6, another embodiment of a level 10B, in accordance with the principles of the present invention is depicted, including a miter marking feature. A miter disc 100 is attached to the body 12B at a point along the apex 18B. Miter disc 100 may be attached in any suitable fashion that maintains body of the disc 18B in a plane perpendicular to a plane created by the line of apex 18B. For example, as shown an arc of the body 12B may be recessed to accommodate the miter disc 100. Where desired, a bolt, or a bolt hole may be provided in the body 12B along apex 18B in order to allow the miter disc 100 to be removably attached as an optional feature.

A rotatable disc 104 is rotatably attached to the miter disc 100, as by a center axle, a center thumbscrew, or otherwise. A locking mechanism, such as thumbscrew 106 is also present. An indicator 108 present in the rotatable disc 104 is used to select a desired angel indicated by the miter angle markings 102 located on the miter disc 100. It will be appreciated that alternative embodiments of angle selection and locking mechanisms may be used, such as angle markings n the rotatable disc 104, or a spring tension locking mechanism. A flexible miter arm 110 located on the rotatable disc 104 may be flexed or bent to mark a selected angle on a pipe or other construction member. The end of the arm 110 may be configured to retain a marker, such as a soapstone or pencil. It is preferred the angular markings 102 be set, such that appropriate miters are marked on a pipe when the centerline finding function, as discussed in detail further herein, is used to place apex 18 of level 10A at a centerline of the pipe, with marked angels in relation to the centerline.

Replaceable miter markers may be used, each set to specific angles, or having different length arms 110 for use with different size construction members.

Using an embodiment of a multi-use level in accordance in the principles of the present invention, a number of different positioning functions may be performed. Methods and processes for performing these functions will be discussed with reference made to the embodiments of FIGS. 1–6 for clarity. It will be appreciated that alternative embodiments falling within the scope of the present invention may be used to perform these processes, and any reference to a depicted embodiment is illustrative only and should not be read as limiting the present invention.

A simultaneous reading of the for a vertical and horizontal level at any desired angle may be obtained in the following fashion. The protractor bracket 17 is adjusted to the desired angle and locked in place with the locking thumbscrew 18, such that the bull's eye level is visible. The level 10 is then attached to pipe P, either by the magnets 54 or with strap 11 (as shown in FIG. 1). The pipe P is moved into rough position and adjusted until the bull's eye level shows a level reading. Pipe P is then fixed in position (as by welding attached or otherwise) at the proper angle and level both vertically and horizontally. Where an exact slope for the pipe P is required, the slope (rise/run) expressed as the appropriate angle and set on the protractor bracket 17 may be used to position the pipe P. Appropriate formulas for slope, in standard English, metric or other units may be placed on a planar member 13 or 15 for convenience. Installation of the laser allows the level to be used as a transit level With the directional laser 38 installed, and the protractor bracket 17 adjusted to the desired position, the level 10 may be used as a transit level, for setting grade or other positioning. Attached to a pipe P as discussed previously herein, the directional laser 38 is activated and pipe P is adjusted until the laser beam 39 (shown as the dashed line in FIG. 2) contacts the target and the bull's eye level 16 reads level. Pipe P may then be secured in the appropriate grade. Where a directional laser 38 including an EDM (electronic distance measurement) function is used, the distance to the target may be set as well.

A level 10 in accordance with the principles of the present invention may function as a marking square. For use as a simple square, the protractor bracket 17 is adjusted to lie even with the long edge of the planar member 13 (preferably at a 0 degree reading). The edge of the level shelf 14 may then be placed over the edge and the edge of the planar member 13 used to mark the angle. Other angles may be set as desired on the protractor bracket 17, allowing a speed square function.

A level 10 including rotary dial 30 and a vial level 34 on the second surface of the level shelf 14 may be used to find the centerline of a pipe. The protractor bracket is set even with the short end of planar member 13 (preferably an angle of 90 degrees as marked by the graduations 22). Rotary dial 30 is set so the vial bubble 34 will read level when apex 18 is positioned exactly perpendicular to the pipe. When a level reading is obtained punch 50 is inserted through marking holes 56 and tapped with a hammer to mark the pipe P, alternatively, a pencil or other marker is inserted and a mark made. Marks made along the length of the pipe allow the centerline to the marked with a chalk line. Adjusting the angle of rotary dial 30 allows offsets from a center line to be located and marked.

Although the present invention has been shown and described with respect to preferred embodiments, various additions, deletions and modifications that are obvious to a person skilled in the art to which the invention pertains, even if not shown or specifically described herein, are deemed to lie within the scope of the invention as encompassed by the following claims.

What is claimed is:

1. A level for the positioning of elongate structural members, said level comprising:
    a body comprising a first planar member having a long axis and a second planar member having a long axis, said first and second planar members joined at edges parallel to their respective long axes to form an angular body having an apex at an outer surface;
    a level shelf having a first surface and a second surface,
    a protractor bracket attached to said level shelf, said protractor bracket rotatably attached to said first planar member, such that said level shelf may be rotated to a desired angle in relation to the first planar member;
    a bull's-eye level disposed on said first surface of said level shelf; and
    a flange bracket removable attached to said body, said flange bracket comprising an elongated planar body having a long axis and two attachment legs at either end extending perpendicularly to said long axis within the plane of said elongated body, a connection hole passing through said elongated body and an elongated connection groove passing through said elongated body, said elongated connection groove aligned with said connection hole.

2. The level of claim 1, further comprising a locking mechanism for maintaining said protractor bracket at a desired angle.

3. The level of claim 2, wherein said locking mechanism comprises a thumbscrew.

4. The level of claim 1, further comprising graduations for reading said desired angle disposed on said first planar member.

5. The level of claim 1, further comprising
    a rotary dial attached to said second surface of said level shelf, such that said rotary dial may be rotated to a desired angle; and
    a bubble vial level disposed on said rotary dial.

6. The level of claim 1, further comprising at least one marking hole disposed through said body at said apex, as bore of said marking hole running perpendicular to a hypotenuse of a triangle formed by the first and second planar member.

7. The level of claim 1, further comprising a groove formed in an end of said body, said groove aligned with said apex to allow a plumb line to extend therethrough.

8. The level of claim 1, further comprising a directional laser removably attached to said level shelf.

9. The level of claim 1, wherein said flange bracket is removably attached to said body by containing said first planar member between said two attachment legs, such that the plane of said planar member is continuous with the plane of said elongated planar body of said flange bracket.

10. The level of claim 9, wherein said first planar member comprises attachment grooves at either end thereof, such that said attachment legs of said flange bracket reside therein when said bracket is removably attached.

11. The level of claim 1, further comprising at least one magnet contained in said body for attachment to a metallic construction member.

12. The level of claim 1, wherein said body is constructed of metal.

13. A level for the positioning of elongated structural members, said level comprising:
- a body comprising a first planar member having a long axis and a second planar member having a long axis, said first and second planar members joined at edges parallel to their respective long axes to form an angular body having an apex at an outer surface;
- a level shelf having a first surface and a second surface,
- a protractor bracket attached to said level shelf, said protractor bracket rotatably attached to said first planar member, such that said level shelf may be rotated to a desired angle in relation to the first planar member;
- a bull's-eye level disposed on said first surface of said level shelf;
- a miter disc attached to said body at said apex, such that said miter disc lies in a plane perpendicular to a plane created by the line of said apex;
- a rotatable disc rotatably attached to said miter disc; and
- at least one miter arm attached to said rotatable disc, such that said at least one miter arm may be manipulated within an angle set by said rotatable disc to mark a miter on a construction member.

14. The level of claim 13, further comprising a locking thumbscrew to prevent rotation of said rotatable disc at a desired position to maintain said miter arm within said angle.

15. A method of finding a center line of a pipe, said method comprising:
- providing a level comprising:
  - a body comprising a first planar member having a long axis and a second planar member having a long axis, said first and second planar members joined at edges parallel to their respective long axes to form an angular body having an apex at an outer surface,
  - at least one marking hole disposed through said body at said apex, as bore of said marking hole running perpendicular to a hypotenuse of a triangle formed by the first and second planar member,
  - a level shelf,
  - a protractor bracket attached to said level shelf, said protractor bracket rotatably attached to said first planar member, such that said level shelf may be rotated to a desired angle in relation to the first planar member,
  - a rotary dial attached to said level shelf, such that said rotary dial may be rotated to a desired angle,
  - a fixed miter disc attached to said body at said apex, such that said fixed miter disc lies in a plane perpendicular to a plane created by the line of said apex,
  - a rotatable miter disc rotatably attached to said fixed miter disc,
  - at least one miter arm attached to said miter disc, such that said at least one miter arm may be manipulated within an angle set by said rotatable miter disc to mark a miter on a construction member, and
  - a bubble vial level disposed on said rotary dial;
- placing said level on a pipe, such that said long axes of said first and second planar member are parallel to a long axis of said pipe, with said outer surface of the level facing outward;
- adjusting said protractor bracket to be parallel to said long axis of said first planar member;
- adjusting said rotary dial at an angle where said bubble vial level will to read level when perpendicular to a center line of said pipe;
- orienting said level until said bubble vial level reads level; and
- marking a centerline of said pipe through said at least one marking hole.

16. The method according to claim 15, wherein marking a centerline of said pipe through said marking hole comprises inserting a punch through said at least one marking hole and tapping said punch to create a mark on said pipe.

17. The method according to claim 15, further comprising:
- rotating said rotatable miter disc to a desired miter angle; and
- marking said miter angle on said pipe by manipulating said miter arm.

* * * * *